March 26, 1963

J. W. CHALMERS 3,082,924

APPARATUS FOR FEEDING PRINTED AND LIKE
WEBS AND CUTTING BLANKS THEREFROM

Filed April 20, 1961

INVENTOR
John W. Chalmers
BY
Watson, Cole, Grindle & Watson
ATTORNEYS

March 26, 1963    J. W. CHALMERS    3,082,924
APPARATUS FOR FEEDING PRINTED AND LIKE
WEBS AND CUTTING BLANKS THEREFROM
Filed April 20, 1961    2 Sheets-Sheet 2
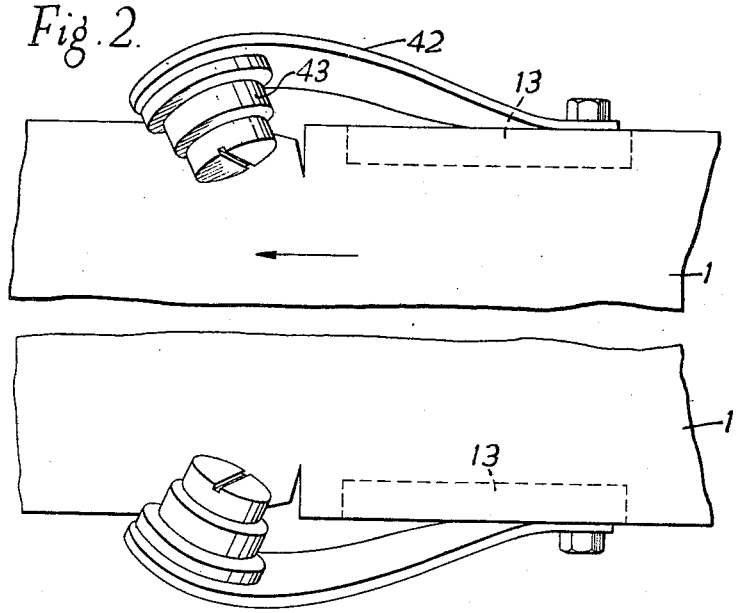
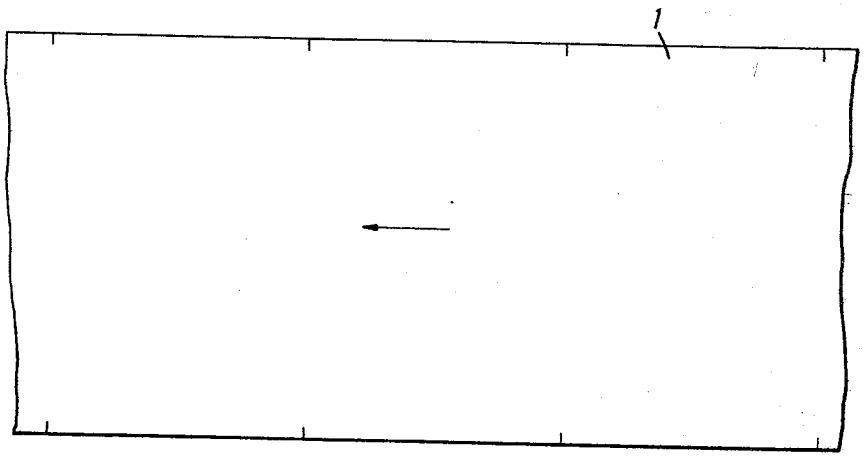
INVENTOR
John W. Chalmers
BY
Watson, Cole, Grindle & Watson
ATTORNEYS

United States Patent Office 3,082,924
Patented Mar. 26, 1963

3,082,924
APPARATUS FOR FEEDING PRINTED AND LIKE WEBS AND CUTTING BLANKS THEREFROM
John Walker Chalmers, Deptford, London, England, assignor to Molins Machine Company Limited, London, England, a British company
Filed Apr. 20, 1961, Ser. No. 104,312
Claims priority, application Great Britain Feb. 8, 1961
5 Claims. (Cl. 226—71)

This invention concerns web-feeding apparatus, e.g. apparatus for feeding printed and like webs and cutting blanks therefrom. Such apparatus is sometimes used for supplying blanks to packing or wrapping machines but a difficulty arises in maintaining register between any printing, ornament or design on the web and the line on which the blanks are cut. It will be readily understood that it is very important for any blank which is to be wrapped around an article to have the printing properly disposed with respect to the sides of the article. For brevity, printing, embossing, design or any other ornament on the web will be referred to hereafter as indicia.

According to the present invention there is provided web-feeding apparatus, comprising a pusher element arranged to engage one of a series of edges formed in the web and thereby to push the web lengthwise, and feeding means to feed the web lengthwise towards the pusher element at a rate sufficient to provide slack in the web between the pusher element and the feeding means, the said feeding means being arranged periodically to release the web momentarily to allow the web to move backwards sufficiently to prevent undue accumulation of slack. By this means the web can be accurately fed forwardly by the pusher element registering with accurately spaced edges (e.g. edges of transverse cuts) in the web, while the main work of feeding the web from its source, usually a reel is done by the feeding means, which can for this purpose comprise cooperating feed rollers. To allow such feed rollers to release the web momentarily, at least one of them may have a part of its circular periphery interrupted, e.g. by a flat.

Further according to the present invention there is provided apparatus for feeding a web having indicia thereon, and provided with at least one cut located in register with said indicia, to a cutting device in which blanks are cut from the web, and comprising a feed pawl adapted to engage an edge defined by the said cut and movable through a distance equal to the blank length, a cutter arranged to receive web thus fed and cut a blank from the leading end, feed rollers to feed web towards the pawl at a faster rate than is required so that a loop is formed between rollers and pawl, one of said rollers having part of its circular periphery interrupted, and a movable tension roller preceding the feed rollers and arranged to take up slack caused by the loop when the interrupted part of the roller periphery permits the web to move backwards. The most desirable form of cut is a slit at each side of the web, when naturally there will be a pawl at each side, but it is known to have webs which have perforations in their margins and any such cut-out or cut will serve the purpose of the present invention providing it has an edge suitable for engagement with the feed pawl.

The pawl may be arranged to oscillate to and fro over an arcuate surface which supports the web and to move faster than the web feeding rate during the feeding stroke whereby part or the whole of the loop is taken up and on its backward stroke the feed rollers feed further web to cause another loop to form. At the end of a feeding stroke of the pawl the interrupted part of one feeding roller is opposed to the other feeding roller and the tension roller thereupon pulls back the loop so as to make the web reasonably taut in order to avoid undue displacement or accumulation of web in the loop.

Where the cuts are marginal cuts as aforesaid, there may be provided rollers or the like attached to the pawl and arranged to depress material at the margins of the web beyond the cuts as considered with respect to the feed pawl so as to ensure that a pawl positively engages the edge of a cut in order to cause accurate feeding.

Apparatus according to the invention will now be described with reference to the accompanying drawings, in which:

FIGURE 2 is an enlarged local view looking in the direction of the arrow A, FIGURE 1, and FIGURE 3 shows a portion of a web provided with marginal slits.

Figure 1:
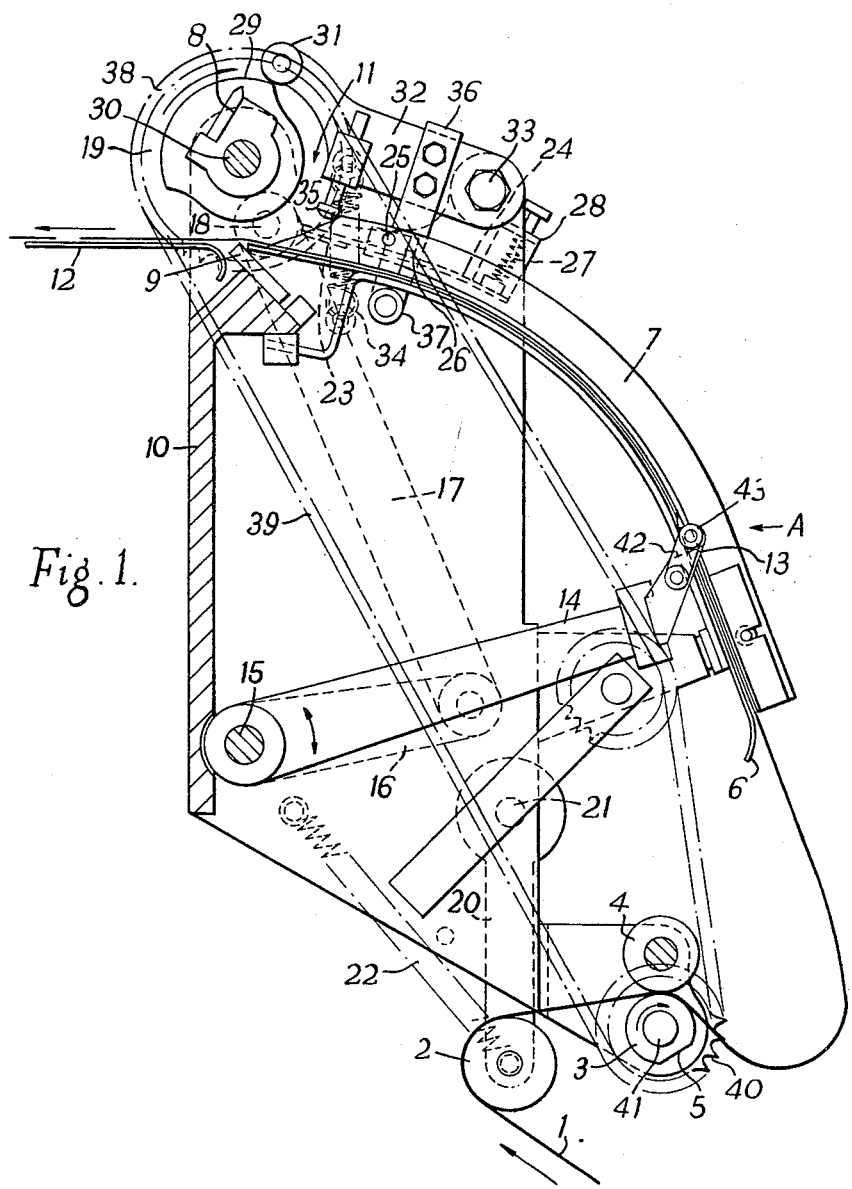
FIGURE 1 is a side view of the apparatus with the frame partly in section.

Referring to the drawings, a web 1 is fed from any source such as a reel and passes round a tension roller 2 and between feed rollers 3 and 4. The roller 4 is merely a cooperating or presser roller and the roller 3 is the actual feeding roller. This has its periphery interrupted by a flat 5 formed by cutting away part o fthe periphery of the roller. The web passes beyond the rollers 3 and 4, and goes over an arcuate guide 6 which has top guides 7 so as to define a narrow space through which the web moves. At the end of the arcuate guide 6 there is arranged a cutting device comprising a rotary cutter 8 and a fixed cutter 9, of well known type. The cutter 9 is fixed to the frame 10 of the apparatus. At 11 is a brake which is arranged to grip the web at the moment of cutting so as to prevent any displacement. Cut blanks coming from the cutting device pass along a plate 12 on which they are conveyed in any desired manner and in the present example are fed into a packet making machine to form packets.

The web, which is provided at its edges with transverse cuts or slits as shown in FIGURES 2 and 3, is moved over the guide 6 by feed pawl devices 13, engaging edges of successive slits, one pawl being provided at each side of the web as can be seen in FIGURE 2. Each pawl is attached to a lever 14 pivoted at 15 and to the pivot there is fixed another lever 16 whose free end is attached to a connecting rod 17 the other end of which is mounted on a crank pin 18 of a crank disc 19. The tension roller 2 is freely rotatable on the end of an arm 20 pivoted at 21 and is drawn to the left in FIGURE 1 by a spring 22.

The movements of the parts are so arranged that during each feeding stroke of the pawls, the feed rollers 3 and 4 are positively feeding the web forwardly faster than the pawls, so that a loop of slack web is formed just beyond the rollers as shown in FIGURE 1. Thus the feed rollers do the major part of the work of feeding the whole web forwardly, enabling the pawls to operate without exerting undue force on the edges of the slits in the web which might damage them. After the conclusion of each pushing stroke of the pawls, the web is clamped against the guide 6 as will be described below, and also the flat 5 on the roller 3 comes opposite the roller 4 so that the web is momentarily released from the grip of these feed rollers and can be pulled backwardly by the tension roller 2. This withdraws some of the web from the loop mentioned above, and thus takes up some of the slack. The parts may be arranged so that substantially the whole of the slack is taken up after each pushing stroke of the pawls, or they may be so arranged that the loop is only reduced to a smaller size each time the tension roller draws the web back. In any case the arrangement is such as to prevent undue accumulation of slack in the web.

The brake device generally indicated by the reference 11 comprises a brake pad 23 fixed to a plate 24 which is pivoted at 25 to brackets 26 bent up from the guide 6. A spring 27 mounted beneath a bridge 28 presses down the right-hand end of the plate 24. The brake is operated to grip the web by a cam 29 mounted on a shaft 30 to which the rotary cutter 8 is also fixed.

A roller 31 engages the cam and is mounted on a lever 32 pivoted to the frame 10 at 33 and drawn down by a spring 34. On the lever 32 is adjustably fixed a presser 35 which presses on the plate 24 just above the pad 23 as the lever 34 moves downward. The timing is such that the web is gripped just as cutting is to take place and the brake continues to hold the web during the return movement of the pawl while the tension roller is taking up slack in the loop. Since there is a tendency for web to stick to the fixed blade during a cutting operation a device is provided for ensuring that this cannot take place and this is effected by moving the neighbouring end of the strip guide 6 upwards, the movement being imparted to the guide by the cam in the following manner:

To the cam lever 32 is fixed a bar 36 which has a roller 37 at its lower end located beneath the guide 6. Thus when the lever 32 rises again under the influence of the cam after the cutting operation has been effected the guide 6 is also pulled up and dislodges the leading end of the web following the cut, should the said end become attached to the fixed knife 9. The parts 29, 31, 32, 34, 35, 36, 37 are duplicated, one set being at each side of the guide 6 for, as can be seen from FIGURE 2, a wide web is being fed.

The various moving parts of the mechanism are driven from the shaft 30 which has a sprocket wheel 38 fixed on it around which a chain 39 passes, said chain also passing around a sprocket 40 attached to the shaft 41 of the feed roller 3. The crank disc 19 is also fixed on the shaft 30. Thus all the parts move in timed relationship.

As will be understood the pawls could reasonably be expected to engage some cuts in the web margins merely by moving beneath the web until they reach the cuts but this arrangement is not considered positive enough where simple slits are used. To ensure that the pawls positively engage the slits there is attached to the pawl device at each side a support strip 42 having a roller 43 at its end. As the pawl moves backwards along the web each roller will be above the web and will tend to depress the material in the manner shown in FIGURE 2, that is, just in advance of a pawl face as the feeding stroke repeats, thus ensuring that the edge to be engaged by the pawl will intercept the latter. As the web is fed by means of marginal slits at both edges of the web, two pawls are used and consequently two pressing rollers 43 are also used.

With the arrangement described it is possible to cut lengths from a printed or like web in exact register with the print thereon since the slits or the like are made at the time of printing, often by having cutters associated with the actual printing roller.

What I claim as my invention and desire to secure by Letters Patent is:

1. Web-feeding apparatus, comprising a pusher element arranged to engage one of a series of edges formed in the web and thereby to push the web lengthwise, feeding means to feed the web lengthwise towards the pusher element at a rate sufficient to provide slack in the web between the pusher element and the feeding means, the said feeding means being arranged periodically to release the web momentarily to allow the web to move backwards sufficiently to prevent undue accumulation of slack, and means arranged before the feed means to maintain a tension in the web so as to draw the web backward whenever it is released by the feeding means.

2. Apparatus for feeding a web having indicia thereon, and provided with at least one cut located in register with said indicia, and comprising a feed pawl adapted to engage an edge defined by the said cut and movable through a distance equal to the blank length, feed rollers to feed web towards the pawl at a faster rate than is required so that a loop is formed between rollers and pawl, one of said rollers having part of its circular periphery interrupted, and a movable tension roller preceding the feed rollers and arranged to maintain a tension in the web so as to take up slack caused by the loop whenever the interrupted part of the roller periphery permits the web to move backwards.

3. Apparatus as claimed in claim 2, wherein the said pawl is arranged to oscillate to and fro over an arcuate surface which supports the web and to move faster than the web feeding rate during the feeding stroke whereby part or the whole of the loop is taken up and on its backward stroke the feed rollers feed further web to cause another loop to form.

4. Apparatus as claimed in claim 3, wherein at the end of a feeding stroke of the pawl the interrupted part of one feeding roller is opposed to the other feeding roller and the tension roller thereupon pulls back the loop so as to make the web reasonably taut in order to avoid undue displacement or accumulation of web in the loop.

5. Apparatus as claimed in claim 2, comprising a roller or the like attached to the pawl and arranged to depress material at the margins of the web beyond the cuts as considered with respect to the feed pawl so as to ensure that a pawl positively engages the edge of a cut in order to cause accurate feeding.

References Cited in the file of this patent
UNITED STATES PATENTS

| | | |
|---|---|---|
| 1,565,109 | Rose | Dec. 8, 1925 |
| 2,108,767 | Fitzgerald | Feb. 15, 1938 |
| 2,815,075 | Braunstein et al. | Dec. 3, 1957 |
| 3,021,988 | Focht | Feb. 20, 1962 |